United States Patent [19]

El Omary

[11] Patent Number: 5,115,765

[45] Date of Patent: May 26, 1992

[54] FLEA BLOWER VACUUM FOR PETS

[76] Inventor: Hany M. El Omary, 3202 Westerland Dr., Houston, Tex. 77063

[21] Appl. No.: 625,143

[22] Filed: Dec. 10, 1990

[51] Int. Cl.⁵ ............................................. A01K 13/00
[52] U.S. Cl. ..................................... 119/83; 119/156; 43/139; 15/346
[58] Field of Search ...................... 119/83, 85, 87, 156; 449/7, 27, 61; 43/139, 141; 15/344, 345, 346, 347

[56] References Cited

U.S. PATENT DOCUMENTS

| | | | |
|---|---|---|---|
| 3,145,691 | 8/1964 | Yates | 119/83 |
| 3,209,386 | 10/1965 | Weber | 15/344 |
| 3,513,500 | 5/1970 | Hori | 15/344 |
| 4,011,624 | 3/1977 | Proett | 15/344 |
| 4,204,298 | 5/1980 | Handa et al. | 15/344 |
| 4,218,806 | 8/1980 | Cohn | 15/344 |
| 4,279,095 | 7/1981 | Aasen | 43/139 |
| 4,485,583 | 12/1984 | Planty | 43/139 |
| 4,577,365 | 3/1986 | Yuen | 15/339 |
| 4,599,823 | 7/1986 | Lee | 119/156 |
| 4,630,329 | 12/1986 | Shores | 43/139 |
| 4,779,572 | 10/1988 | Freulon | 119/85 |
| 4,799,460 | 1/1989 | Kuhl | 119/85 |
| 4,918,857 | 4/1990 | Wade | 43/139 |
| 4,972,541 | 11/1990 | Smith, Jr. | 15/344 |

FOREIGN PATENT DOCUMENTS

| | | | |
|---|---|---|---|
| 930775 | 7/1955 | Fed. Rep. of Germany | 15/344 |
| 3521603 | 12/1986 | Fed. Rep. of Germany | 15/344 |
| 292939 | 1/1929 | United Kingdom | 119/85 |
| 688871 | 3/1953 | United Kingdom | 43/139 |
| 935807 | 9/1963 | United Kingdom | 15/346 |

Primary Examiner—Robert P. Swiatek
Assistant Examiner—Todd E. Manahan

[57] ABSTRACT

The invention is directed to a self-contained blower/-vacuum unit for pets. A disposal bag housing is mounted within an exterior housing. The disposal bag housing defines a central passage and a perimeter opening between the disposal bag housing and the exterior housing. The disposal bag housing also has a screen positioned over the trailing end of the central passage. A filtering disposal bag is positioned within the central passage. A brush is latached to the disposal bag housing. A motor and fan are positioned within the housing for drawing air through the central passage, blowing air across a heater coil and out the perimeter opening.

2 Claims, 4 Drawing Sheets

FLEA BLOWER VACUUM FOR PETS

FIELD OF INVENTION

This invention is directed to a blower/vacuum unit for extracting fleas, and debris from pets.

BACKGROUND

There are many prior art vacuum cleaners. These vacuum cleaners include devices for vacuuming specific elements. Most of the vacuum cleaner units known in the art are of the upright, tank type. Others are portable, hand held units. Most include motor driven brushes. Some are hand held, portable and battery operated.

The known vacuum cleaners designed for general use are not efficient for vacuuming fleas from pets. For example, sweeper units with rotating brushes are not acceptable as such units tangle hair. This irritates and hurts the pet. The battery operated vacuums are not strong enough to extract the fleas. So, a new, AC operated blower/vacuum is highly desirable and needed.

Several types of vacuum cleaners for pets have been developed. For example, see U.S. Pat. No. 2,972,160. It is a vacuum cleaner for hair only. U.S. Pat. No. 3,145,691 is an attachment to a blower as a brush for animal hair. U.S. Pat. Nos. 3,573,500 and 4,011,624 are normal portable vacuum cleaners. U.S. Pat. No. 4,799,460 is only a battery operated vacuum. It does not blow and draw the air simultaneously. Air draw alone does not loosen the fleas grip and extract them. Therefore the need exists for simultaneous blow/draw air action. The blow/draw action causes the fleas to jump, lose their grip and be carried by the air flow. A disposal bag intercepts and traps the fleas.

SUMMARY OF THE INVENTION

This invention is directed to a light weight, AC operated, blower, vacuum unit. It is primarily useful to clean fleas and debris from pets. It also grooms and dries the pet's coat.

The unit includes an external housing, composed of an upper housing part and a lower housing part. The power source is connected to a motor via a multi-switch setting. The power source also energizes an electric heating coil to a desired temperature. The fan draws the air from the center and blows it out around the edge of the housing. The blown air is heated to a degree comfortable for the animal but hot enough to irritate the fleas. The air flow is drawn through a disposal bag. The bag is powdered with a flea killing chemical. When the brush and the air groom the pet, they cause the fleas to jump. The fleas lose their grip and are carried by the air flow to the disposal bag. The bag intercepts the fleas where they are held by the continuous air flow. At the end of the operation while the unit is still running, the operator draws the disposal bag string to close the bag so the fleas and other debris are trapped inside. The operator turns off the unit and disposes of the bag. The brush is interchangeable since it is mounted by snap latches. Various brushes with different size bristles suitable for different animals may be used.

Figure 1:
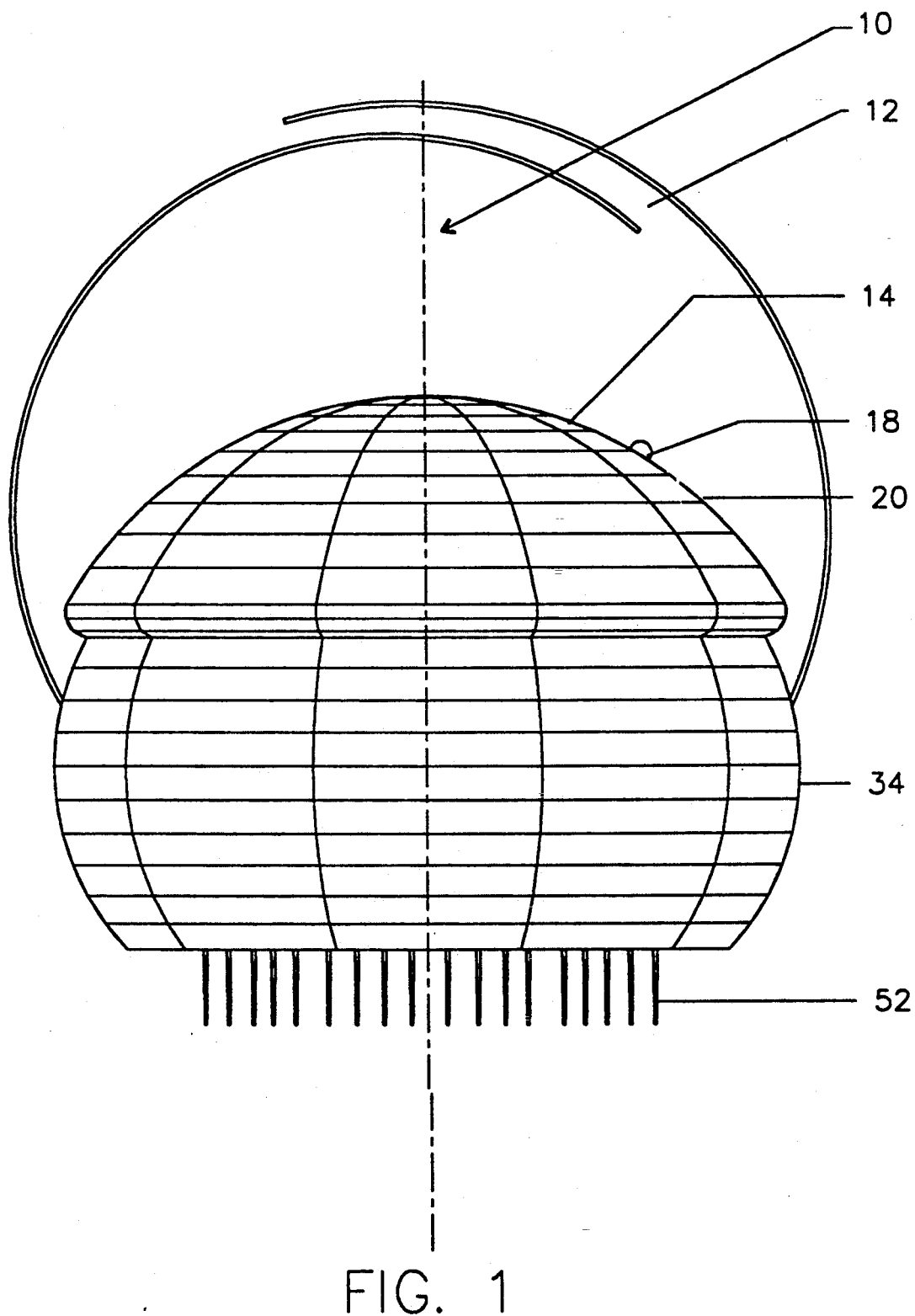
FIG. 1 is an external elevational view of the flea blower/vacuum/dryer invention.

| Reference Numerals in Drawings | |
|---|---|
| 10 Flea Blower/Vacuum Unit | 12 Hand Straps |
| 14 Upper Housing Part | 16 Power Supply Cord |
| 18 Thumb Switch | 20 Outer Vent Opening |
| 22 Inner Vent Opening | 24 Latch Joint |
| 26 Electric Motor | 28 Fan |
| 30 Motor Shaft | 32 Electrical Heating Coil |
| 34 Lower Housing Part | 36 Electric Coil Support |
| 38 Plastic Disposal Bag Housing | 40 Disposal Bag Housing Support |
| 42 Annular Perimeter Opening | 44 Snap Latches |
| 46 Disposal Bag Housing Screen | 48 Disposal Flea Bag |
| 50 Circular Groove | 52 Bristle Brush |
| 54 Circular Brush Aperture | 56 Direction of Air Stream |

DESCRIPTION OF THE PREFERRED EMBODIMENT

Referring to FIG. 1, there is shown a general view of the exterior arrangement of the flea blower/vacuum invention 10. The unit 10 is spherical-shaped. The housings 14 and 34 can be made of any suitable material such as Polypropylene or the like. A high impact material is used to provide structural strength.

The flea blower/vacuum 10 includes an external housing. The housing has an upper part 14 and a lower part 34 which snap securely together. A pair of strips 12 are secured in the lower housing part 34. They secure the operator's hand in place during the grooming operation. A thumb switch 18 operates the unit. An annular shaped bristle brush 52 defines a central aperture. A plurality of firm but flexible bristles are typically made of nylon or the like to groom the pet. The brush comes in different bristle lengths for different animals.

Figure 2:
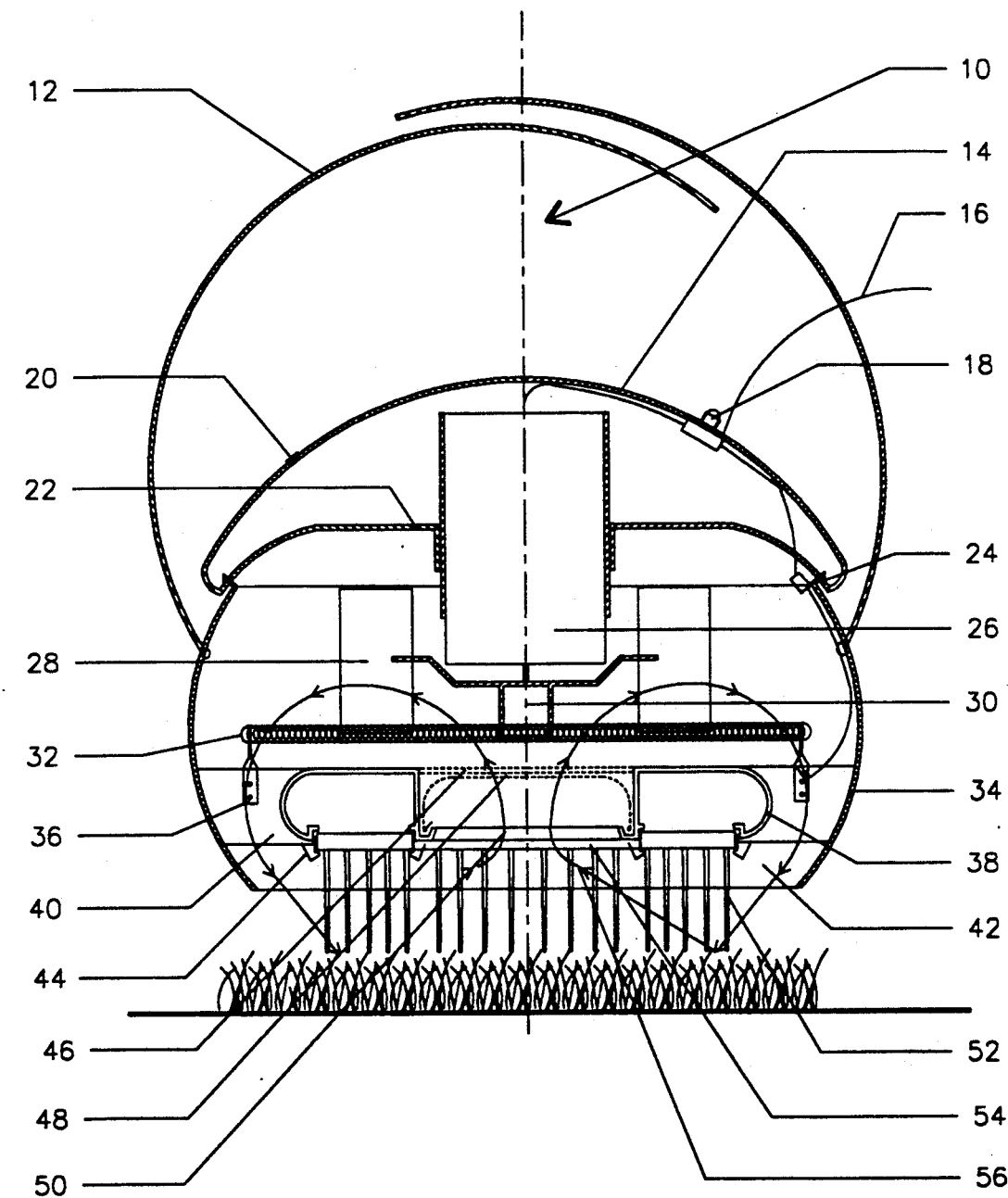
FIG. 2 is an elevational, schematic cross-sectional view of the invention.
Figure 3:
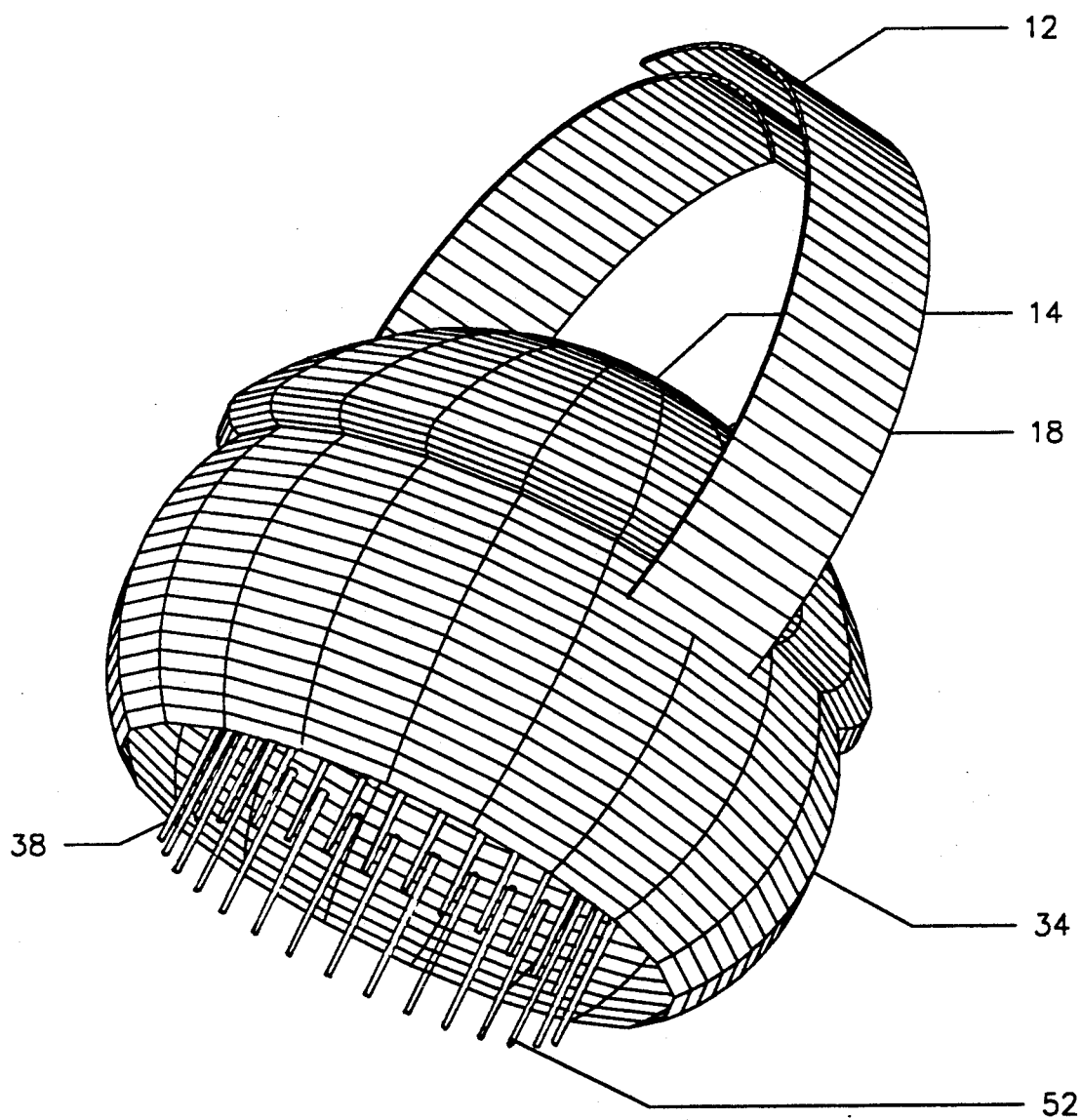
FIG. 3 is an isometric view of the invention.

Referring now to FIG. 2, the upper housing part 14 and the lower housing part 34 are shown joined by latching joints 24. The plastic disposal bag housing 38 is mounted in lower housing part 34. It supports brush 52 and disposal flea bag 48. The plastic disposal bag housing 38 and the lower housing part 34 define an air outlet or annular perimeter opening 42. The disposal bag housing screen 46 is a part of the disposal bag housing 38. It supports the flea disposal bag 48. The disposal bag 48 is made of a filter type material allowing air flow, but intercepting fleas and debris. The disposal flea bag 48 has a round shape with side walls. A drawstring is inserted inside the outer rim of the bag 48. When the operator pulls the drawstring the bag closes. The bag 48 trips the fleas and the debris inside. Groove 50 secures the disposal bag 48 rim away from the air flow.

The brush 52 is shown inserted into the disposal bag housing 38. The flea bag 48 is mounted with the rim inserted inside the groove 50.

A fan 28 is mounted within the space defined by the housing of unit 10. The fan 28 is of a centrifugal type and mounted to the motor 26 by a motor shaft 30. The motor 26 in this application is an AC motor. The motor is preferably light weight and as quiet as possible. The motor 26, and the fan 28 are mounted into the upper housing part 14. An electric heating coil 32 is mounted to the lower housing part 34 by brackets 36. Electric power is connected to the motor 26 and the heater 32 via the multi-setting switch 18. The heater can be selectively activated.

To operate the unit, the operator inserts a fresh disposal bag 48 in the lower housing part 34. He fits the outer rim inside the groove 50. He grasps the unit 10, mounts the straps around his backhand and pushes thumb switch 18 to the desired setting.

Motor 26 drives fan 28. The heating coil 32 heats the air. The air flows in the direction marked by the arrows indicated by 56. When the operator grooms the animal, the bristles will dislodge debris and irritate fleas causing them to jump loose in the air. The blown heated air supplied from the annular opening 42 bounces against the animal body. This carries the loose fleas and the debris to the disposal flea bag 48. The disposal flea bag 48 intercepts fleas and debris. The drawn air holds the fleas and the debris inside. At the end of the operation while the unit 10 is still running, the operator pulls the flea bag drawstring. This closes the bag 48 with the fleas inside. The operator disposes of the bag 48 and inserts a fresh bag for the next operation.

When the unit 10 is operating adjacent to the animal body, the same air is circulating continuously to function as a flea blower/vacuum. When the heater is on, and the unit 10 is held more than 6 inches from the animal, it functions as a dryer.

Figure 4:
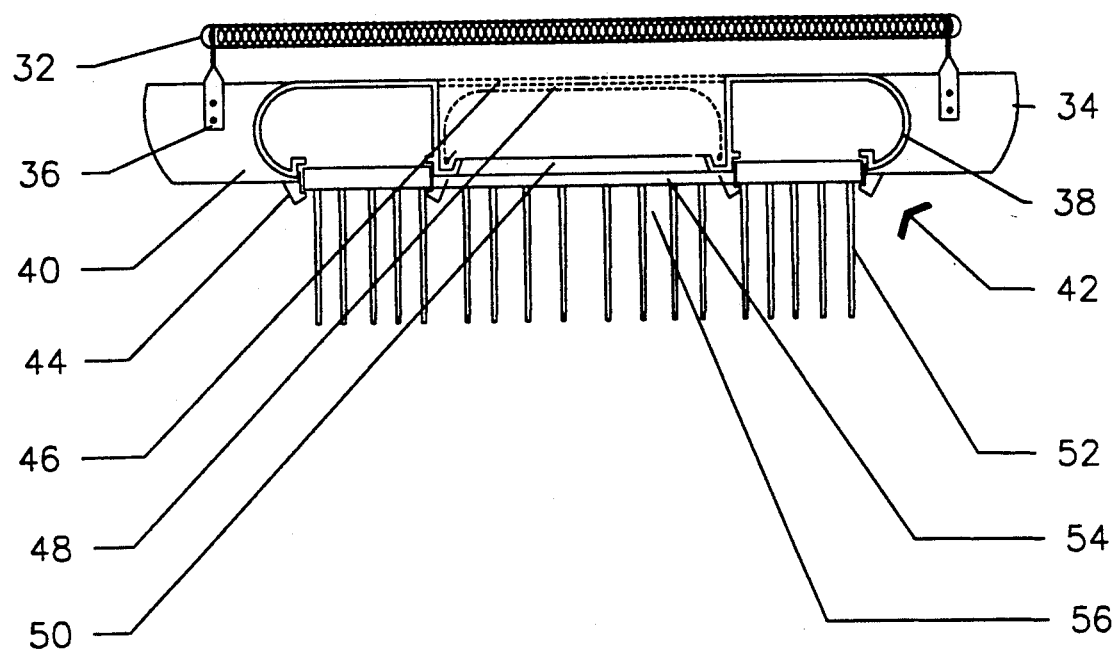
FIG. 4 is an enlarged, schematic view of the disposable flea bag and of the brush mounted with snap latches.

FIG. 4 is an enlarged sectional view for the lower housing part with the brush 52 mounted therein.

Thus there is shown and described a preferred embodiment of the instant invention. The preferred embodiment describes the invention as having a spherical shaped configuration. It is practical to grip. The unit is made of high impact, light weight plastic type material. The specific arrangement of the parts shown and described is believed to be a preferred arrangement. However, other arrangements can be utilized. Furthermore, various means and methods of mounting the various parts within the housing arrangement can, for the most part, reflect design preferences. It is clear that those skilled in the art may develop other configurations and/or provide design changes or modifications to any part of the unit. However, any such changes or modifications are intended to be included herein as well. The scope of the invention is limited only by the claims appended hereto.

Having thus described a preferred embodiment of the invention, what is claimed is:

1. A self-contained blower/vacuum unit for pets comprising:

an exterior housing;

a disposal bag housing mounted within said exterior housing defining a central passage and further defining a perimeter opening between said disposal bag housing and said exterior housing;

said disposal bag housing having a screen positioned over a trailing end of the central passage;

a filtering disposal bag having a rim secured to said disposal bag housing whereby said filtering disposal bag is supported within the central passage by said disposal bag housing and said screen;

a brush latched to said disposal bag housing, said brush having an central aperture complementary to the central passage;

a fan mounted within said exterior housing above said screen and the central passage;

a means for heating mounted within said exterior housing for heating air blown out the perimeter opening; and a means for selectively powering said fan and selectively actuating said heating means, whereby air is drawn by said fan into the central passage, through said disposal bag, across said heating means, and then blown out through the perimeter opening.

2. The self-contained blower, vacuum unit for pets according to claim 1 wherein said exterior housing is spherically shaped defining a spherical cavity for directing air drawn in the central passage and blown out of the perimeter opening.

* * * * *